United States Patent
Siegel et al.

(10) Patent No.: US 9,761,007 B2
(45) Date of Patent: Sep. 12, 2017

(54) METHOD AND SYSTEM FOR APPROXIMATING FULLY CALCULATED IMAGE SEQUENCE FROM A SUBSET OF CALCULATED IMAGE DATA

(71) Applicant: Disney Enterprises, Inc., Burbank, CA (US)

(72) Inventors: Lewis Siegel, Burbank, CA (US); Sean Jenkins, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 150 days.

(21) Appl. No.: 14/741,278

(22) Filed: Jun. 16, 2015

(65) Prior Publication Data

US 2016/0371811 A1 Dec. 22, 2016

(51) Int. Cl.
*G06T 7/20* (2017.01)
*H04N 19/00* (2014.01)
*G06T 13/00* (2011.01)
*G06T 13/20* (2011.01)

(52) U.S. Cl.
CPC ............... *G06T 7/20* (2013.01); *G06T 13/20* (2013.01); *H04N 19/00* (2013.01); *G06T 13/00* (2013.01)

(58) Field of Classification Search
CPC ........... G06T 13/80; G06T 2207/10016; G06T 13/00; G06T 2210/44; G06T 2213/08; G06T 13/20; G06T 15/00; G06T 15/50
See application file for complete search history.

(56) References Cited

PUBLICATIONS

Schmelzenbach, Mark, Charles Hansen, and Brian Smits. "Rapid, Realistic Image Generation." Thesis. University of Utah, 1999. Rapid, Realistic Image Generation. May 13, 2001. Web. Jan. 6, 2016. <http://www.cs.utah.edu/~schmelze/thesis/final.html>.*
Tawara, Takehiro. "Efficient global illumination for dynamic scenes." (2007).*

* cited by examiner

*Primary Examiner* — Gregory J Tryder
*Assistant Examiner* — Scott E Sonners
(74) *Attorney, Agent, or Firm* — Patterson + Sheridan, LLP

(57) ABSTRACT

The disclosure provides an approach for approximating a fully calculated image sequence from a subset of calculated image data. In one configuration, a rendering application calculates, for each image in the image sequence, a subset of pixels including pixels previously occluded by object(s) in preceding images and pixels whose ages have exceeded a threshold value. The rendering application then approximates the remaining non-calculated image data by interpolating the image data that has been calculated and merges the calculated and approximated image data to obtain the final image sequence. In a particular configuration, entire images may be recalculated at regular intervals to prevent excessive image quality degradation. In another configuration, the recalculation of pixel data may be offset by randomly initializing pixel age values. In yet another configuration, a combination of recalculating entire images and refreshing pixels at offset intervals may be used.

20 Claims, 9 Drawing Sheets

METHOD AND SYSTEM FOR APPROXIMATING FULLY CALCULATED IMAGE SEQUENCE FROM A SUBSET OF CALCULATED IMAGE DATA

BACKGROUND

Field

This disclosure provides techniques for rendering image sequences. More specifically, this disclosure presents techniques for approximating a fully calculated image sequence from a subset of calculated image data.

Description of the Related Art

In digital image production, computer software may be used to generate sequences of images from both two-dimensional (2D) and three-dimensional (3D) models. Such digital image productions are often constrained by the time or computational resources needed to fully calculate all of the image data necessary for a complete sequence of images, such as the image frames of a movie. In other cases, fully calculated image data may not be needed, such as when only a low-quality preview of an image sequence is desired. As a result, there is a need for a technique that approximates a fully calculated image sequence without calculating all image data in the image sequence.

SUMMARY

One aspect of this disclosure provides a computer implemented method for rendering a sequence of images. The method generally includes fully calculating or reconstructing a first image in the image sequence. Further, the method includes, for each of a plurality of subsequent images in the image sequence: determining a subset of pixels in the image to be calculated, the subset of pixels being less than all pixels in the image; calculating image data for the determined subset of pixels; and propagating calculated image data from one or more neighboring images to each pixel in the image that is not calculated.

Other aspects include, without limitation, a computer-readable medium that includes instructions that enable a processing unit to implement one or more aspects of the disclosed method as well as a system configured to implement one or more aspects of the disclosed method.

BRIEF DESCRIPTION OF THE DRAWINGS

So that the manner in which the above recited features of the present disclosure can be understood in detail, a more particular description of the disclosure, briefly summarized above, may be had by reference to various aspects, some of which are illustrated in the appended drawings. It is to be noted, however, that the appended drawings illustrate only exemplary configurations and are therefore not to be considered limiting of its scope, which may admit to other equally effective configurations.

Figure 1:
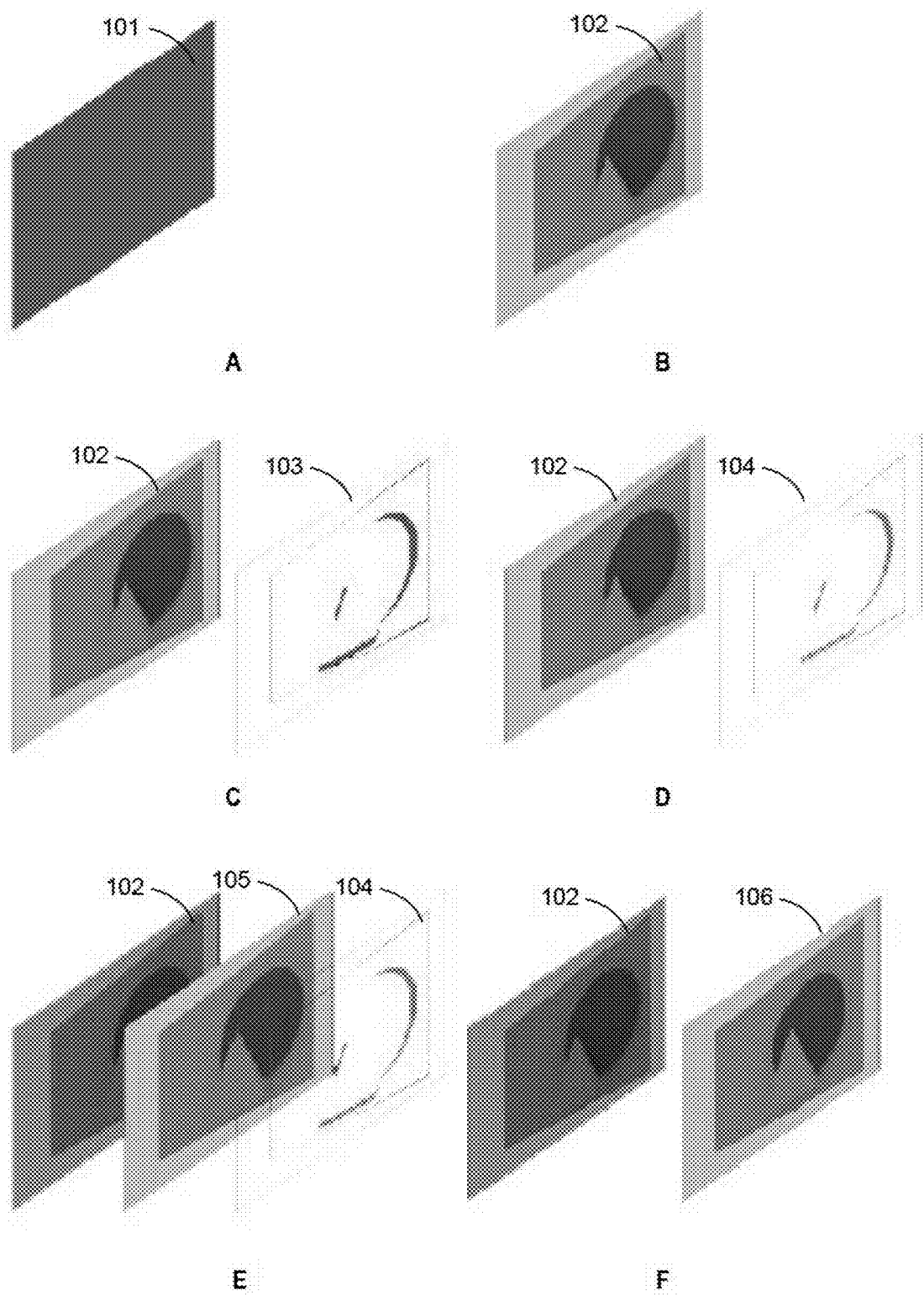
FIG. 1 illustrates an approach for approximating fully calculated image sequences using a subset of calculated data, according to an aspect of this disclosure.

To facilitate understanding, identical reference numerals have been used, where possible, to designate identical elements that are common to the figures. It is contemplated that elements and features of one configuration may be beneficially incorporated in other configurations without further recitation.

DETAILED DESCRIPTION

This disclosure presents techniques for approximating a fully calculated image sequence from a subset of calculated image data through frame interpolation, thereby reducing the time and computational resources needed to render a sequence of images. As used herein, frame interpolation refers to rendering (also referred to herein as "calculating") only certain images, or certain pixels of certain images, while estimating the remaining, non-rendered pixels or images from the rendered pixels and images. In one configuration, a rendering application may only calculate, for each image in a sequence of images, a subset of pixels including pixels previously occluded by object(s) in preceding images and pixels whose ages have exceeded a threshold value. The rendering application may then approximate the remaining non-calculated image data by interpolating the image data that has been calculated and merge the calculated and approximated image data to obtain the final image sequence. Position and motion data obtained from an initial, low-cost image sequence that is generated without performing lighting calculations may be used in this process to determine the previously occluded pixels and to warp image data in the interpolation of calculated image data. In one configuration, entire images may be recalculated at regular intervals to prevent excessive image quality degradation. In another configuration, the recalculation of pixel data may be offset by randomly initializing pixel age values. In yet another configuration, a combination of recalculating entire images and refreshing pixels at offset intervals may be used.

Although discussed herein primarily with respect to a rendering application, it should be understood that steps of techniques disclosed herein need not be performed by a single application and may be performed by multiple applications in some configurations. For example, a rendering application may calculate image data, while a post-render compositing application may perform interpolation. That is, references to the rendering application are made herein to describe example configurations, while other equally effective configurations may use any number of applications to perform the same steps performed by the rendering application.

FIG. 1 illustrates an approach for approximating fully calculated image sequences using a subset of calculated data, according to an aspect of this disclosure. As shown in panel A, every pixel needs to be rendered for a first image, as indicated by a render mask 101. The render mask 101 is an image whose pixel values indicate whether a corresponding pixel in the actual image is to be rendered. For example, the render mask 101 may be a binary image with pixels having value 1 indicating that corresponding pixels of the image are to be rendered and value 0 indicating that corresponding pixels of the image are not rendered.

As discussed in greater detail below, the pixel mask 101 may generally indicate that previously occluded pixels are to be rendered. Previously occluded pixels may include pixels that have been revealed as a result of the motion of object(s) but were occluded by another object or by an object itself (i.e., self-occluded pixels) in previous image(s) and therefore not visible in those image(s). Conversely, pixel mask 101 may indicate that pixels which were not previously occluded are not rendered. Rather than rendering such pixels, the rendering application may interpolate corresponding pixels in previous image(s) to approximate the rendered pixels. It should be understood that such interpolation cannot be performed for previously occluded pixels which did not appear in the previous image, and this is the reason that previously occluded pixels need to be fully calculated.

For the first image, the pixel mask 101 may indicate that all pixels need to be rendered, as shown in panel A. As no pixel data exists prior to the first image, all of the pixels in the first image may be considered as previously being occluded. Panel B depicts the resulting first image 102 after all the pixels are rendered. Although discussed herein primarily with respect to fully calculating a first image, it should be understood that some configurations may only require an image reconstruction on a first image (or last image in the case of backward interpolation) and not fully calculate any images. The reconstructed image may include both fully rendered pixels, as per a render mask, and reconstructed pixels which approximate pixels from a fully rendered image. The contribution from the reconstructed pixels to the final result may be minimal, but this step may still eliminate darkening that can result from otherwise empty/black pixels that become mixed into the filtering process.

After rendering the first image 102, the rendering application may generate a second render mask 103 which indicates pixels to render in a second image, as shown in panel C. In order to generate the second render mask 103, the rendering application may first generate a low-cost image sequence for objects that are directly visible to the camera in the image sequence, a process that is also referred to herein as the "utility render." To generate the low-cost image sequence, the rendering application may cast only camera rays while avoiding more expensive lighting calculations. For each pixel, the rendering application may shoot, from the camera, a small number of rays or possibly even a single ray that may hit an object in the scene, and the rendering application then compiles data that tracks the position and motion of a point on the surface of the object so that it can be determined where the point came from in a preceding image and where the point moves to in a subsequent image. In a particular configuration, the compiled data may include distance from the camera, object identifiers (IDs), motion data, depth data, motion depth data (indicating the depth of visible pixels at their locations on neighboring images), and pixel coverage data. It should be understood that this is not an exhaustive list. For example, other types of data may be obtained to improve occlusion testing or interpolation itself. Using the compiled data, the rendering application may determine which pixels were previously occluded and are now being revealed. The rendering application then updates the render mask 103 to indicate such previously occluded pixels as pixels to be fully calculated.

In one configuration in which motion depth data is obtained, motion depth data may be compared with regular depth data to determine occlusions. As discussed, motion depth indicates both depth and motion, as motion depth data may be the combination of a 2D, pixel-space motion vector, along with the single valued motion depth. Ordinary motion vectors are 2D vectors (in raster or 'pixel' space) showing how a pixel moves from its location on one frame to another pixel location on the previous or subsequent frame. While such motion information alone is sufficient to align the pixels on neighboring frames, it is not enough information to determine depth based occlusion. This is because after the pixel has been aligned to a matching pixel on a neighboring frame, it is not known how far it is from the camera on that frame, as motion vectors are only 2D vectors in pixel space. With motion depth data, after pixels are aligned, a depth comparison can be made, and if the motion depth is greater than the corresponding ordinary depth on the neighboring frame, then the pixel is occluded on that frame. Otherwise the pixel is not occluded.

In some configurations, the render mask 103 may also indicate that pixels whose ages exceed a threshold value are to be fully calculated. The pixels of the image 102 may each be associated with an age that is incremented as time progresses from one image to the next. As the pixel data is interpolated forward in time (or backward in time), pixel data may pass through the pixel being tracked over some number of images. In such a process, image quality may degrade over time due, among other things, to the filtering process that blends pixels to produce the next image. Such filtering arises when a neighboring frame is warped to match the current frame. As motion vectors map integer valued pixel coordinates to non-integer valued coordinates on neighboring frames, good quality image warping requires a filter step to properly distribute pixel data among partially overlapping pixels. However, such filtering contributes incrementally to image degradation on each frame. To remedy this problem, the rendering application tracks pixel ages which indicate the distance (in frames) to an image with valid, calculated data (in the forward or backward direction), and the pixels are periodically refreshed (i.e., fully calculated) if their ages exceed a threshold value. In one configuration, referred to herein as "discrete" interpolation, every pixel's age may be initialized to the same value such that images are fully calculated at a regular interval. In another configuration, referred to herein as "stochastic" interpolation, the pixel ages may be initialized to random values within a range of values such that some pixels whose ages exceed the threshold value are refreshed at displaced intervals in each image of the image sequence. In yet another configuration, referred to herein as "stratified" interpolation, a combination of stochastic and discrete interpolation may be used in which pixel ages are initialized to random values, and pixels refreshed at displaced intervals, but entire images are also recalculated periodically.

Using the render mask 103, the rendering application fully calculates image data for pixels that need to be rendered according to the rendering mask 103. This type of render is also referred to herein as a "sliver render." The image data 104 resulting from such a sliver render is depicted in panel D.

As shown in panel E, the rendering application then makes a copy 105 of the previous image 102 and warps existing image data in the copied image 105 to generate image data approximating the pixels that were not calculated in the sliver render. Warping refers to stretching pixel data through time and position to non-calculated areas in neighboring images and stitching the pixels back together. In one configuration, the rendering application may, for each such pixel that was not calculated, traverse a neighborhood of surrounding pixels in space and time and propagate calculated pixel data from neighboring images (e.g., a preceding image) into the non-calculated pixels. In a particular configuration, the rendering application may examine the motion vectors between neighboring images, generated during the utility render, and warp image data along those motion vectors to obtain the pixel data for the non-calculated pixels. Note, there may be feature doubling in occluded areas where there is no render output data. However, these are areas already calculated for the sliver render. In another configuration, optical flow may be used to reconstruct occluded areas (that are not fully calculated). This would be appropriate when rendered image data or motion vectors are not available, such as when promoting existing, traditional 2D animation from monoscopic to stereoscopic projection. In yet another configuration, image in-painting techniques may be used to reconstruct occluded areas.

As shown in Panel E, the rendering application merges the sliver render image 104 with the copied image 105 having data approximating non-calculated pixels. The interpolated result from such a merging is then taken as the second image 106 of the image sequence. To render additional images, the same process of generating a render mask based on output from a utility render, fully calculating image data for a subset of pixels according to the render mask, approximating the remaining image data that is not fully calculated, and merging the fully calculated and approximated image data may be employed. The final image sequence generated from this process is an approximation of the fully calculated image sequence including lighting, materials, color, and global illumination, among other things, that is traditionally expensive to render.

Figure 2:
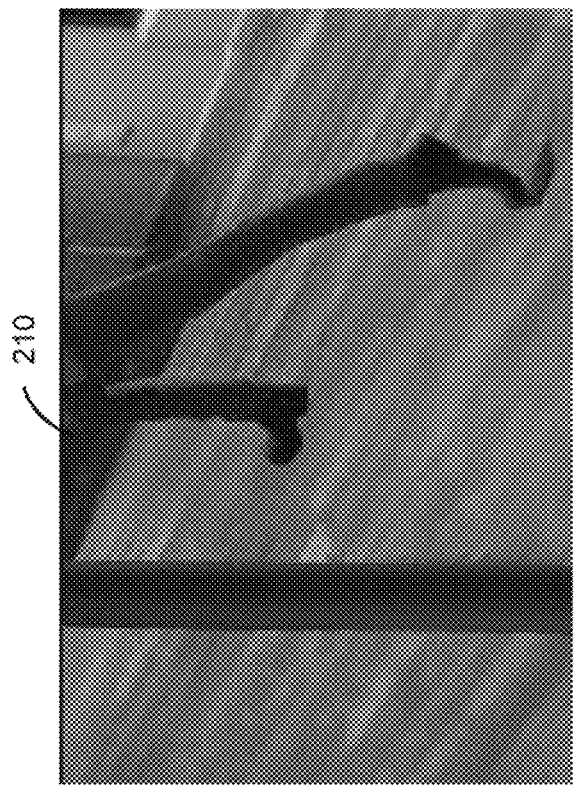
FIG. 2 illustrates interpolating a fully calculated image in the forward direction, according to an aspect of this disclosure.
Figure 2:
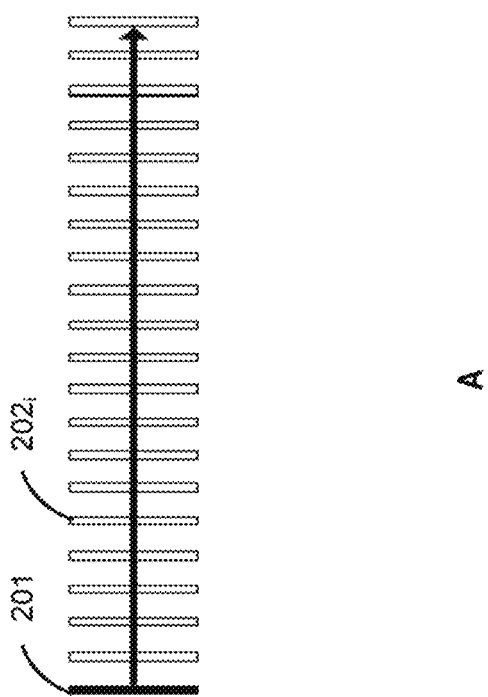

FIG. 2 illustrates interpolating a fully calculated image in the forward direction, according to an aspect of this disclosure. As shown in panel A, a first image 201 is fully calculated. The rendering application generates the remaining images $202_i$ by fully calculating previously occluded pixels based on a render mask, discussed above, and using interpolation to obtain non-calculated pixel data. That is, the rendering application generates the sequence of images by fully rendering the first image and interpolating in the forward direction indefinitely to generate additional images.

Panel B illustrates an image resulting from such indefinite interpolation. The warping step of the interpolation, in which image data may be warped along motion vectors to obtain the pixel data for non-calculated pixels, constitutes a filtering process that blends pixels. Such a filtering process, when performed over successive images, may cause the image to soften over time, as shown in the softened floor in panel B. Only when the occluded pixels are revealed and calculated in full are those pixels restored to their original rendered quality from the softened quality.

Figure 3:
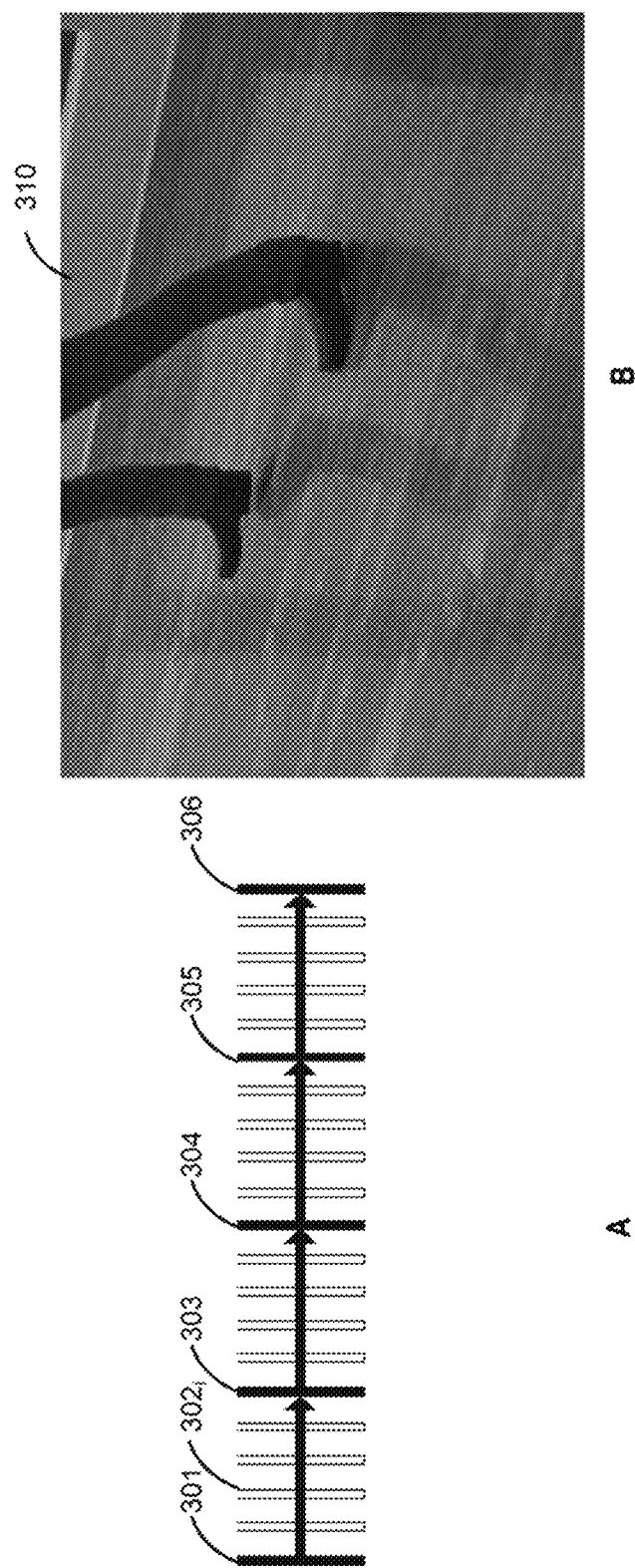
FIG. 3 illustrates interpolating in the forward direction images which are fully calculated at regular intervals, according to an aspect of this disclosure.

FIG. 3 illustrates interpolating in the forward direction images which are fully calculated at regular intervals, according to an aspect of this disclosure. By forcing full images to be rendered at a given interval, the softening image quality discussed above can be remedied. As shown in panel A, the rendering application may render, e.g., every fifth image (images 301 and 303-306) in full, while only fully rendering previously occluded areas in the intermediate images (images $302_i$). As discussed, this approach of rendering full images at discrete intervals is also referred to herein as discrete interpolation.

The result of discrete interpolation according to one configuration is shown in panel B. As shown, a popping artifact is evident in the rendered image 310. In a "popping" artifact, reflections and shadows may 'stick' to the surfaces they are on, and then "pop" into the current location on the next fully rendered frame. Illustratively, the shadow of the character's forward foot is trailing behind, as the floor has been interpolated from an earlier frame that has been fully calculated. This shadow may later pop into the correct location on the next fully rendered frame. In general, popping artifacts may result from secondary lighting effects such as shadows and reflections, for which no motion data is available, and which are baked into the fully calculated images being interpolated. For example, if an object in a scene moves from the light into a shadow, the interpolated data may incorrectly approximate shadow regions using rendered data depicting those regions in the light. As a result, the interpolation process may accumulate filtering artifacts until the next fully calculated image.

Figure 4:
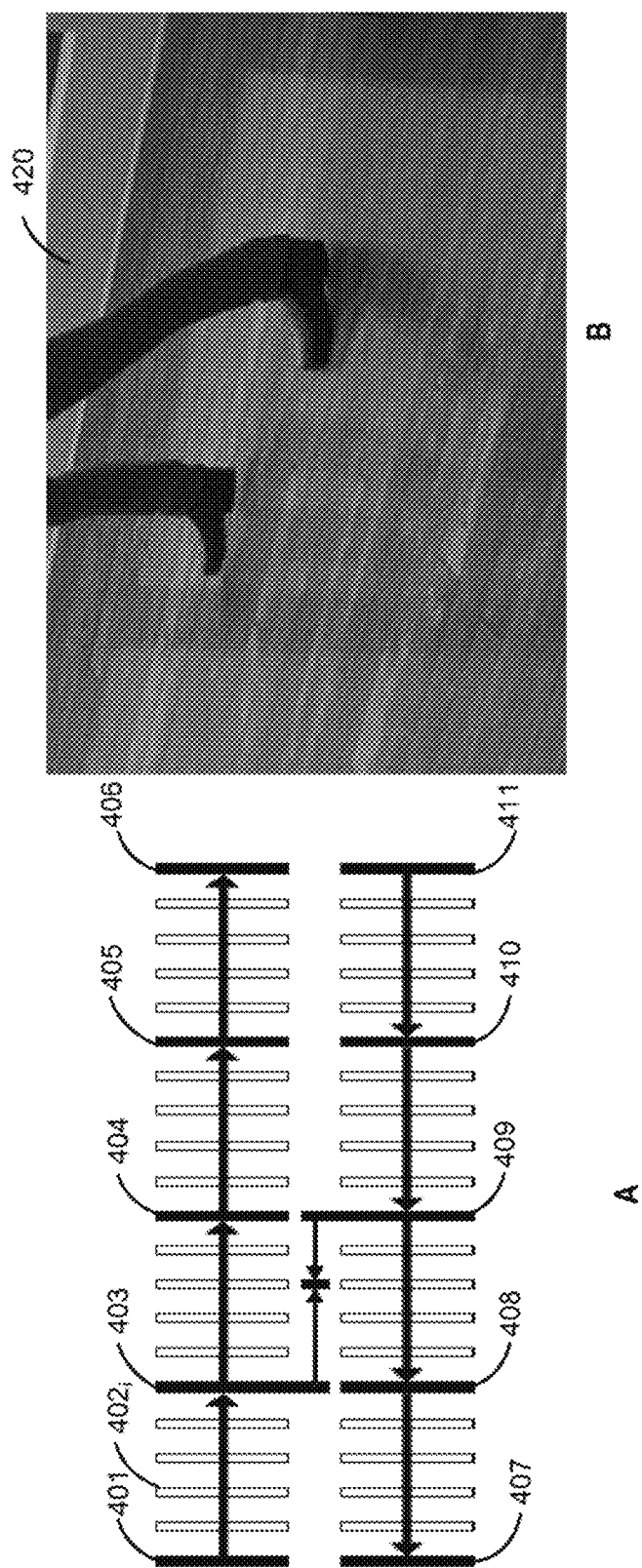
FIG. 4 illustrates interpolating, in the forward and backward directions, images which are fully calculated at regular intervals, according to an aspect of this disclosure.

FIG. 4 illustrates interpolating, in the forward and backward directions, images which are fully calculated at regular intervals, according to an aspect of this disclosure. Similar to the discussion above with respect to FIG. 3, images (images 401 and 403-406) are fully calculated at discrete intervals according to discrete interpolation, and only previously occluded areas are fully calculated in the intermediate images (images $]40_{2i}$). Data for the remaining non-calculated areas in the intermediate images are obtained through interpolation. This process is performed in both the forward and backward directions. Illustratively, the same images 407-411 of the image sequence are fully calculated in the backward direction.

For a given intermediate image $402_i$, the rendering application may combine the results of the forward and backward interpolation by, e.g., selecting for the closest fully calculated image and using the image data interpolated from that image. In another configuration, the rendering application may perform a weighted average based on, e.g., distances in frames to the two fully calculated images immediately preceding and after the intermediate image $402_i$. It should be understood that, in general, any feasible technique may be employed to combine the results of the forward and backward interpolations.

The result of combining such forward and backward discrete interpolations is shown in panel B. Illustratively, strobing is evident in the rendered image 420. For example, the shadow under the character's forward foot has a strobing artifact. Similar to the popping artifacts discussed above, strobing may result from, e.g., outdated secondary lighting effects such as shadows and reflections baked into the fully calculated images being interpolated. However, dissolving between the interpolated results in the forward and backward directions reduces popping artifacts (in the forward and backward interpolated images) to a strobing artifact.

Figure 5:
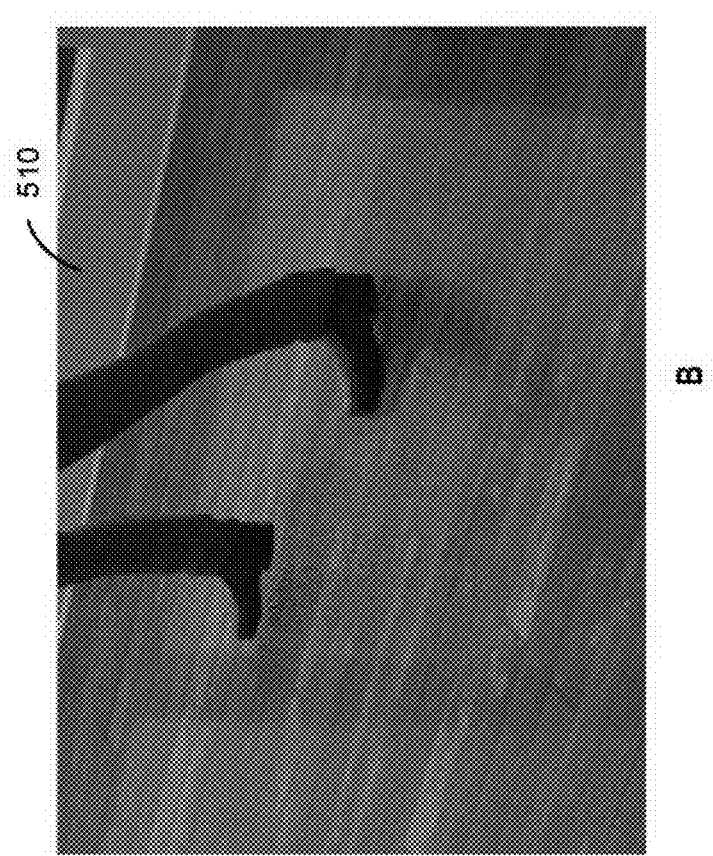
FIG. 5 illustrates interpolating pixels which are initialized to random ages and refreshed at regular intervals, according to an aspect of this disclosure.
Figure 5:
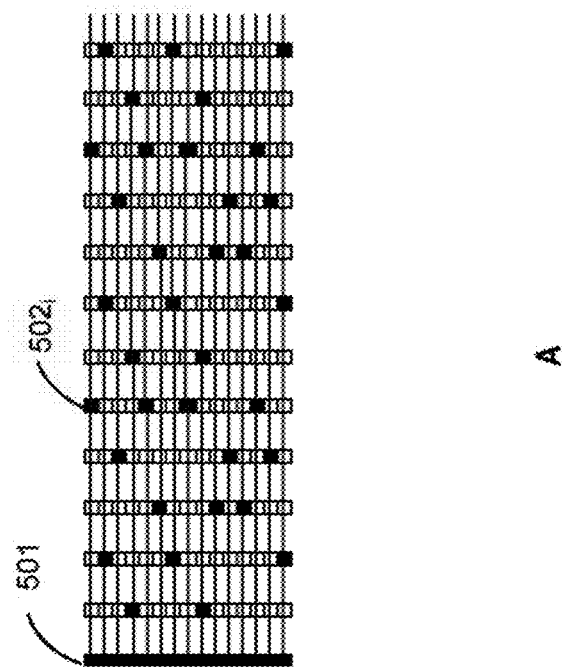

FIG. 5 illustrates interpolating pixels which are initialized to random ages and refreshed at regular intervals, according to an aspect of this disclosure. Rather than fully calculating entire images at regular intervals, such as in the configurations discussed above with respect to FIGS. 2-4, the rendering application may instead recalculate individual pixels at regular intervals. In one configuration, each of the pixels may be initialized to a random age, and the rendering application may refresh a pixel if that pixel's age exceeds a given value. Illustratively, the rendering application still fully calculates a first image 501, but the process of recalculating image data is displaced in time randomly for each pixel 502$_i$ in the image.

In one configuration, the pixels of an image may each be associated with an age that is incremented as time progresses from one image to the next. The image quality may degrade over time due to the filtering process that blends pixels to produce the next image, and the rendering application may refresh the pixels if their ages exceed a threshold value to remedy this problem. This is similar to the recalculation of entire images discussed above with respect to FIGS. 2-4, except that the recalculation is performed on a pixel-by-pixel basis. By initializing the pixel ages to random values within a range of values, the rendering application may refresh pixels at displaced intervals if the ages of the pixels exceed a given value. This approach of refreshing pixels initialized to random ages is also referred to herein as stochastic interpolation. Experience has shown that stochastic interpolation may perform better with noise filtering and frame averaging.

Panel B shows an example image rendered using stochastic interpolation. Illustratively, the strobing (or popping) effect discussed above that results from outdated secondary lighting effects being baked into fully calculated images is masked by the stochastic break up of the interpolation process over time. Continuing the example above where an object in a scene moves from the light into a shadow, the shadow generated through stochastic interpolation would be randomly sampled through the interval as pixels are refreshed, and may thus appear as a fuzzy version of the fully calculated shadow. However, such a fuzzy version of the shadow may be preferable to a strobing (or popping) shadow. If shadow is soft, the rendering application may further apply post-processing techniques to smooth out the shadow.

Figure 6:
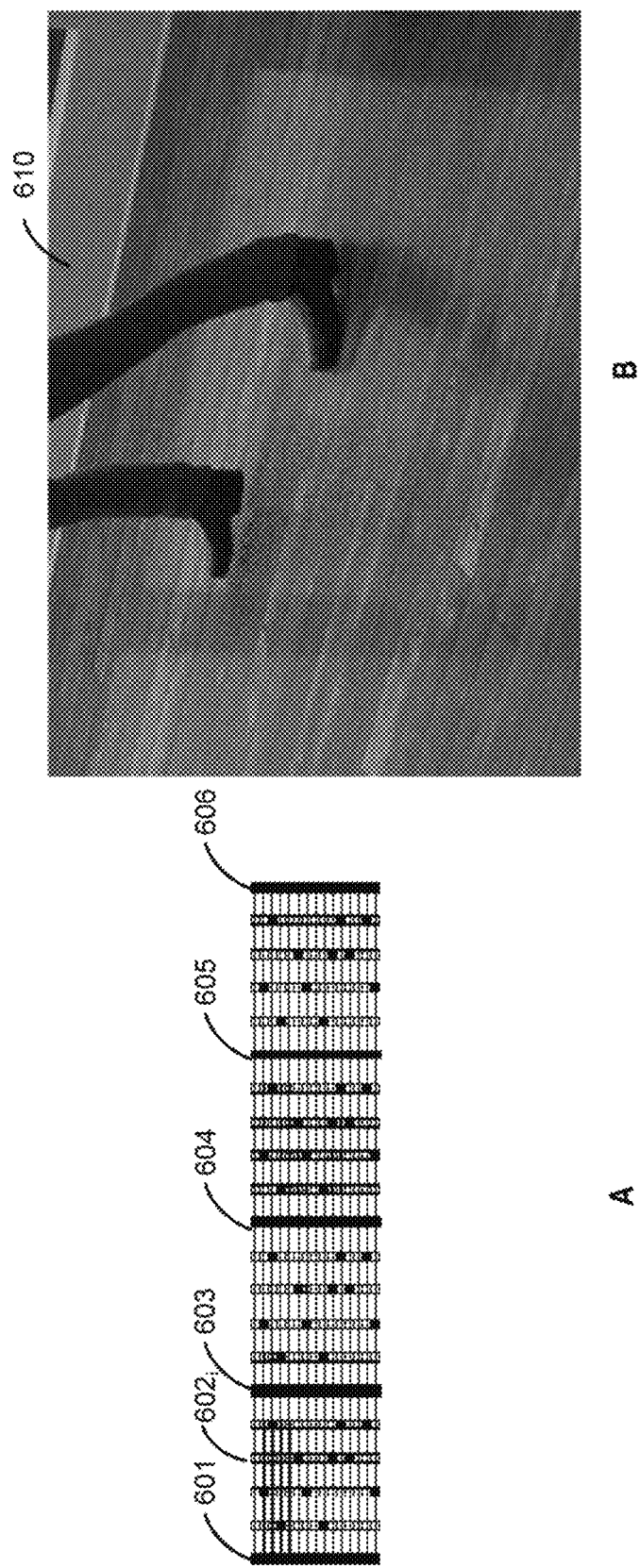
FIG. 6 illustrates interpolating pixels which are initialized to random ages and refreshed at regular intervals, with the images also being fully calculated at regular intervals, according to an aspect of this disclosure.

FIG. 6 illustrates interpolating pixels which are initialized to random ages and refreshed at regular intervals, with the images also being fully calculated at regular intervals, according to an aspect of this disclosure. That is, the discrete and stochastic interpolation discussed above are combined by fully rendering images 601 and 603-606 at regular intervals, while also refreshing, at displaced intervals, individual pixels 602$_i$ whose ages exceed a threshold value. This approach of combining discrete and stochastic interpolation is also referred to herein as stratified interpolation. Panel B illustrates an example image rendered using stratified interpolation.

Figure 7:
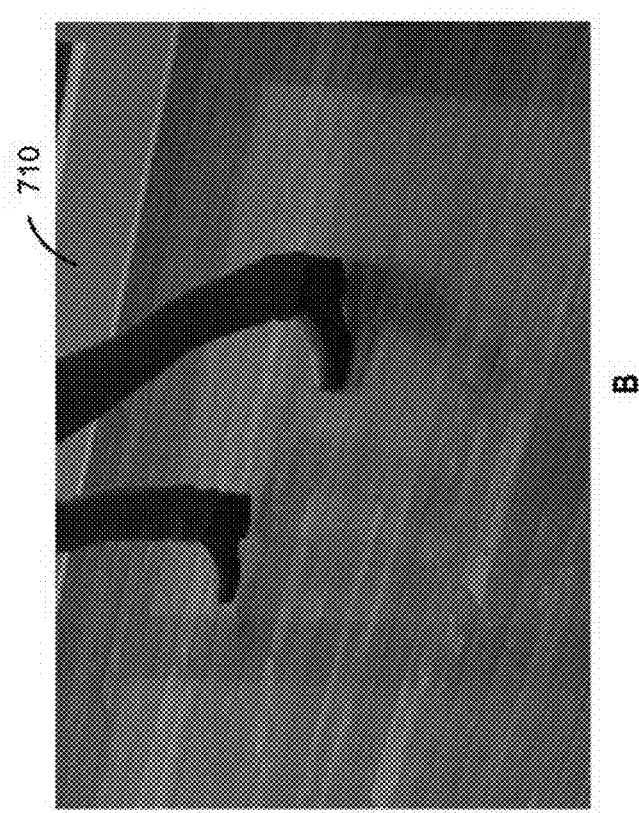
FIG. 7 illustrates parallel interpolation of pixels in the forward and backward directions, according to an aspect of this disclosure.
Figure 7:
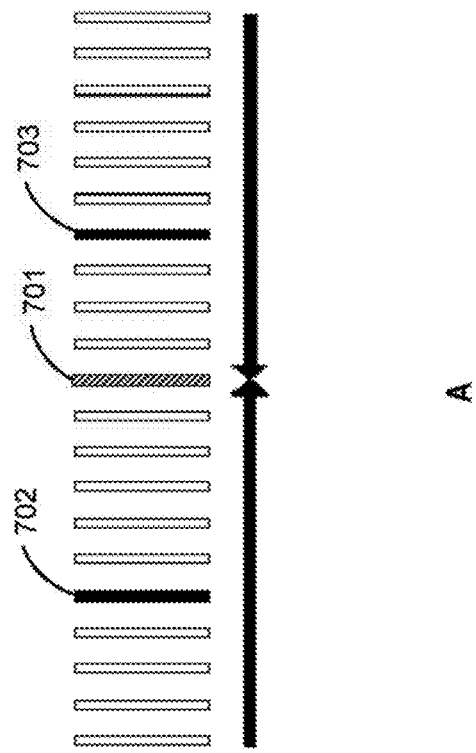

FIG. 7 illustrates parallel interpolation of pixels in the forward and backward directions, according to an aspect of this disclosure. For a particular image 701 and an interval of a given number of images (e.g., 10 images), the rendering application may load a neighborhood of images that surround the image 701 to be interpolated. The rendering application may then run the interpolation process from the images on the outside of the loaded neighborhood inwards in parallel and combine the results from the forward and backward interpolation directions. Discrete, stochastic, or stratified interpolation may be used in this process. The parallel processing tends to be faster than the comparatively lengthier serial process of starting with a full render for the first image and overlaying fully calculated pixels for each subsequent image, which requires independent read and write operations on the subsequent images. That is, by localizing the interpolation process to a neighborhood around a given frame, the memory overhead may be greater, but by having the neighborhood of frames in memory and scanning forward and backward as necessary, the interpolation can be parallelized on a frame basis for a faster, more interactive turnaround time.

Take, for example, the discrete interpolation case which is shown in panel A. The case of stratified interpolation is similar and will not be discussed in detail for conciseness. If the current image happens to land on an image that is being fully calculated, then no addition computation is performed. If, on the other hand, the current image lands between two fully calculated images (e.g., images 702-703), then by running the interpolation process from the images on the outside of a neighborhood of the current image inwards, the rendering application may pick up contributions from the fully calculated images 702-703 while once again only rendering the occluded areas in the current image. In this process, no data is contributed from the images outside the bounding fully calculated images 702-703, and such outside images may even be skipped in one configuration.

On the other hand, if stochastic interpolation is used (not shown), the rendered pixels in each image in the neighborhood of the current image are offset, and the warping step that constitutes a filtering process may filter in empty (or black) pixels that are not rendered in the boundary images. To remedy this problem, the rendering application may first run image reconstruction on the boundary images using, e.g., a succession of blurs and overs on the rendered data, in order to roughly approximate the missing pixels on the initial boundary frames. It should be understood that other image reconstruction techniques may also be employed.

Figure 8:
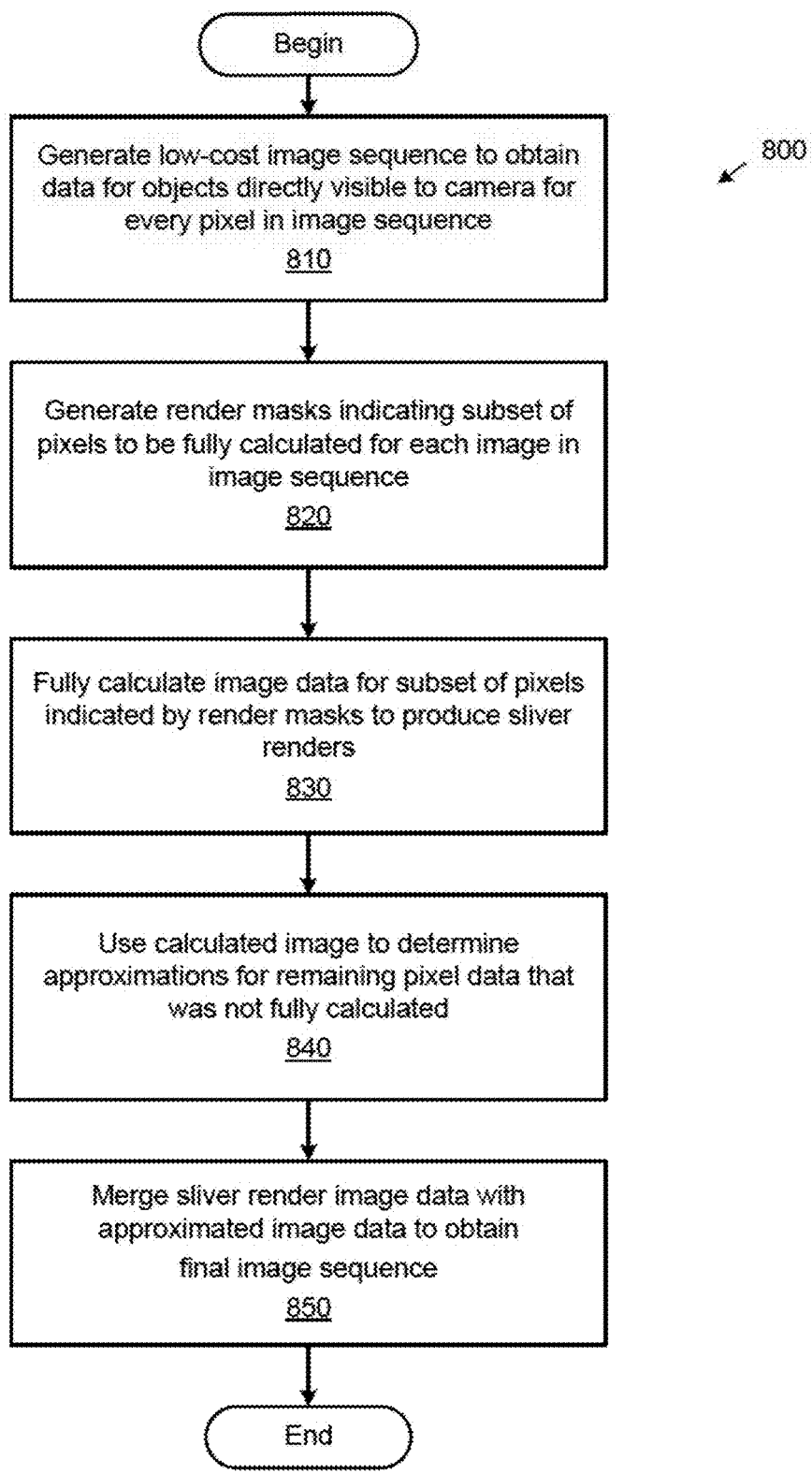
FIG. 8 illustrates a method for rendering an image sequence, which approximates a fully calculated image sequence, from a subset of calculated image data, according to an aspect of this disclosure.

FIG. 8 illustrates a method 800 for rendering an image sequence, which approximates a fully calculated image sequence, from a subset of calculated image data, according to an aspect of this disclosure. As shown, the method 800 begins at step 810, where the rendering application generates a low-cost image sequence to obtain data for objects that are directly visible to the camera for every pixel in the image sequence. As discussed, the rendering application may generally generate the low-cost image sequence by casting only camera rays while avoiding more expensive lighting calculations. To generate the low-cost image sequence, the rendering application may shoot, for each pixel, a small number of rays or possibly even a single ray from the camera that may hit an object in the scene, and the rendering application then compiles data that tracks the position and motion of a point on the surface of the object to determine where the point came from in a preceding image and where the point moves to in a subsequent image. In a particular configuration, the compiled data may include distance from the camera, object IDs, motion data, depth data, motion depth data, and pixel coverage data.

At step 820, the rendering application generates render masks indicating a subset of pixels to be fully calculated. As discussed, each render mask may be, e.g., a binary image with 1's indicating that corresponding pixels in the image should be calculated and 0's indicating that the pixels are not calculated. Further, the render masks may themselves be stored in an image sequence.

The pixels to be rendered may generally include pixels in a first image (which may also be reconstructed rather than being fully calculated), newly revealed pixels that were previously occluded by object(s) in preceding images, as well as pixels whose ages have exceeded a threshold value.

In discrete interpolation, entire images may be refreshed at regular intervals. In stochastic interpolation, the recalculation of pixel data may be offset by randomly initializing pixel age values. Stratified interpolation is a combination of discrete and stochastic interpolation in which pixel ages are initialized to random values and pixels refreshed at displaced intervals, but the entire image is also recalculated periodically.

In one configuration, the rendering application may use the utility render image data generated at step 810 to determine which pixels were previously occluded and are now being revealed. Any feasible occlusion heuristic may be applied in order to determine if a pixel's data exists in another image in the image sequence or if the pixel is instead a previously occluded pixel that is now being revealed. To test for occlusion, the rendering application may generally track the image data through space and time to identify where image data was in a preceding and a subsequent image. Occlusion may then be determined based on, e.g., a comparison of pixels and objects pixels belong to, a comparison of depth or motion depth information, how radically the color of a pixel changes, or some combination of the foregoing. In a particular configuration, motion depth information may be compared with ordinary depth information, after pixels are aligned. In such a case, if the motion depth is greater than the corresponding ordinary depth on the neighboring frame, then the pixel is determined to be occluded on that frame, and vice versa.

At step 830, the rendering application fully calculates the image data for the subset of pixels indicated by the render masks generated at step 820. The image data generated through such a render may be stored in a yet another image sequence.

At step 840, the rendering application uses previously calculated image data stored in the image sequences discussed above to determine approximations for the remaining pixel data that was not fully calculated. That is, the rendering application propagates calculated pixel data into non-calculated pixels in neighboring image(s) to approximate the non-calculated pixels. For example, the rendering application may examine the motion vectors between neighboring images, generated during the utility render, and warp image data along those motion vectors to obtain the pixel data for the non-calculated pixels. As discussed, warping may involve stretching pixel data through time and position to non-calculated areas in neighboring images and stitching the pixels back together. In another configuration, optical flow may be used to reconstruct occluded areas that are not fully calculated. As discussed, this would be appropriate when rendered image data or motion vectors are not available, such as when promoting existing, traditional 2D animation from monoscopic to stereoscopic projection. In yet another configuration, image in-painting techniques may be used to reconstruct occluded areas.

At step 850, the rendering application merges the sliver render image data generated at step 830 with the approximated image data generated at step 840 to obtain the final image sequence. As discussed, the final image sequence may include lighting, materials, color, global illumination, among other things, and is traditionally expensive to render. As the image data is not fully calculated for every pixel in the final image sequence, the time and computational resources needed to generate such an image sequence is reduced.

It should be understood that steps 840 and 850 may be iterative in one configuration. That is, rather than applying sliver renders once all of the interpolation is completed, data from the sliver render may be applied after warping on each frame, with the resulting frame then being used as the starting point for the next frame (in either the forward or backward direction. Such a process is illustrated in, e.g., FIG. 1.

Although forward interpolation is depicted with respect to FIG. 8, it should be understood that interpolation may instead be performed in the reverse direction in which the last image is rendered first and the pixel data from later images are interpolated to obtain non-calculated pixel data in earlier images. In another configuration, the rendering application may combine the results of the forward and backward interpolation by, e.g., selecting for the closest fully calculated image or performing a weighted average based on distances to the two fully calculated images immediately preceding and after the current image. In yet another configuration, the rendering application may interpolate in the forward and backward directions in parallel. In such a case, the rendering application may load a neighborhood of images around the current image and run the interpolation process from the images on the outside of the loaded neighborhood inwards, combining the results from the forward and backward interpolation directions, allowing the process to run in parallel.

Figure 9:
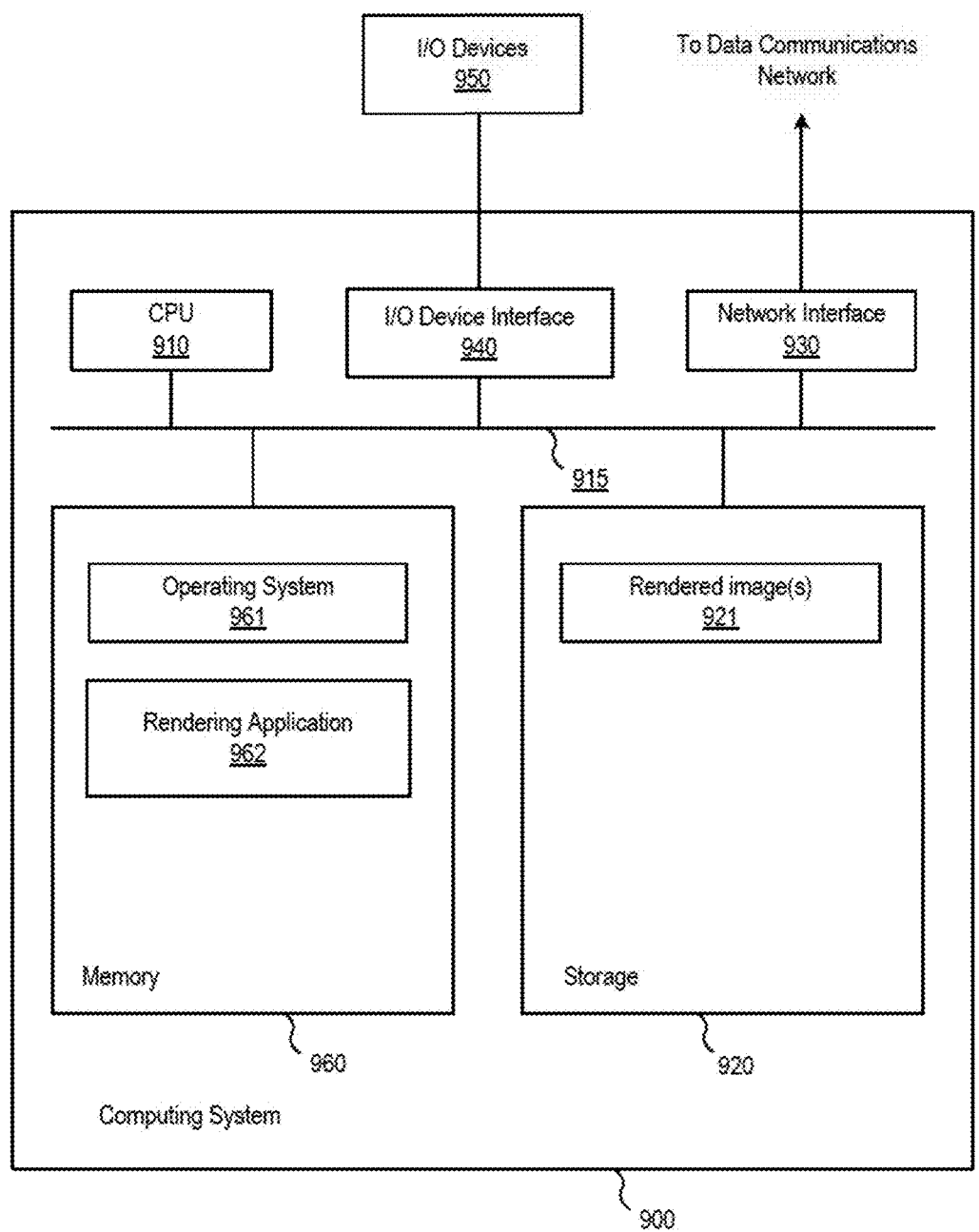
FIG. 9 illustrates a system in which an aspect of this disclosure may be implemented.

FIG. 9 depicts a block diagram of a system 900 in which an aspect of this disclosure may be implemented. As shown, the system 900 includes, without limitation, a central processing unit (CPU) 910, a network interface 930, an interconnect 915, a memory 960 and storage 920. The system 900 may also include an I/O device interface 940 connecting I/O devices 950 (e.g., keyboard, display and mouse devices) to the system 900.

The CPU 910 retrieves and executes programming instructions stored in the memory 960. Similarly, the CPU 910 stores and retrieves application data residing in the memory 960. The interconnect 915 facilitates transmission, such as of programming instructions and application data, between the CPU 910, I/O device interface 940, storage 920, network interface 930, and memory 960. CPU 910 is included to be representative of a single CPU, multiple CPUs, a single CPU having multiple processing cores, and the like. And the memory 960 is generally included to be representative of a random access memory. The storage 920 may be a disk drive storage device. Although shown as a single unit, the storage 920 may be a combination of fixed and/or removable storage devices, such as fixed disc drives, floppy disc drives, tape drives, removable memory cards or optical storage, network attached storage (NAS), or a storage area-network (SAN). Further, system 900 is included to be representative of a physical computing system as well as virtual machine instances hosted on a set of underlying physical computing systems. Further still, although shown as a single computing system, one of ordinary skill in the art will recognized that the components of the system 900 shown in FIG. 9 may be distributed across multiple computing systems connected by a data communications network.

As shown, the memory 960 includes an operating system 961 and a rendering application 962. Illustratively, the operating system may include Microsoft's Windows®. The rendering application 962 is configured to approximate fully calculated image sequences using a subset of calculated data. In one configuration, the rendering application 962 may generate a low-cost image sequence to obtain data for objects that are directly visible to a camera for every pixel in an image sequence, generate render masks indicating a subset of pixels to be fully calculated, fully calculate the image data for the subset of pixels indicated by the render masks to produce a sliver render, use the calculated image data to determine approximations for the remaining image data that was not calculated, and merge the sliver render image data with the approximated image data to obtain the final image sequence, as discussed above with respect to FIG. 8. It should be understood that the rendering application 962 shown may instead be multiple applications in other configurations. For example, a rendering application may calculate image data, while a post-render compositing application may perform interpolation.

Although discussed above with respect to generating entire image frames, in other configurations, techniques disclosed herein may be used to generate portions of image frames. For example, a scene's background that moves slowly may be approximated using techniques disclosed herein, while foreground objects in the scene that move more quickly may be fully calculated, either in a separate rendering pass or by flagging those objects in the render mask as needing to be fully calculated. As another example, some specular and transparent objects that are not approximated well through interpolation may instead be fully calculated in each image by flagging those objects in the render mask as needing to be fully calculated.

Advantageously, techniques disclosed herein calculate only a subset of images and pixels and approximates the remaining images and pixels from the calculated image data. Experience has shown that after the scene geometry has been loaded and tessellated, the resources needed to calculate a set of pixels is roughly linearly proportional to the number of pixels to be calculated. As a result, time and computational resources needed to generate a sequence of images is reduced by applying techniques disclosed herein, which inexpensively create part of the image data from other, calculated image data, while still producing final quality rendered image sequences that approximate fully calculated image sequences. In addition, the particular interpolation techniques disclosed herein, including discrete, stochastic, and stratified interpolation as well as parallel interpolation techniques have their respective advantages, such as lesser time and computational resources required (with stochastic generally needing the least and stratified needing the most resources), reducing the softening of image quality from the filtering process during interpolation, or reducing popping or strobing that results from secondary lighting effects baked into fully calculated images being interpolated. As a result, final image sequences may be generated while sacrificing little quality that is barely noticeable to viewers.

The preceding description references aspects of the disclosure. However, it should be understood that the disclosure is not limited to specific described aspects. Instead, any combination of the preceding features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the preceding aspects, features, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may be embodied as a system, method or computer program product. Accordingly, aspects of the present disclosure may take the form of an entirely hardware aspect, an entirely software aspect (including firmware, resident software, micro-code, etc.) or an aspect combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various aspects of the present disclosure. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

While the foregoing is directed to aspects of the present disclosure, other and further aspects of the disclosure may be devised without departing from the basic scope thereof, and the scope thereof is determined by the claims that follow.

What is claimed is:

1. A computer-implemented method for rendering a first image sequence, comprising:
rendering a second image sequence, without performing lighting calculations, to obtain position and motion information of points on one or more objects in a scene;
calculating or reconstructing a first image in the first image sequence; and
for each of a plurality of subsequent images in the first image sequence:
determining a subset of pixels in the image to be calculated, wherein the subset of pixels is less than all pixels in the image, and wherein the subset of pixels includes previously occluded pixels determined based on at least a portion of the position and motion information,
calculating image data for the determined subset of pixels, and
propagating previously calculated image data from one or more neighboring images in the first image sequence to each pixel in the image that is not calculated, wherein the previously calculated image data is propagated based on at least a portion of the motion information.

2. The method of claim 1, wherein the subset of pixels to be calculated further includes pixels whose age exceeds a predefined threshold.

3. The method of claim 2, wherein the ages of the pixels are initialized to random values within a range of values.

4. The method of claim 3, wherein, for each of the plurality of subsequent images, the previously calculated image data are propagated from images in the first image sequence preceding and subsequent to the image and are blended.

5. The method of claim 3, further comprising, calculating a plurality of subsequent images in the first image sequence that are a predefined interval apart from each other.

6. The method of claim 2, wherein the ages of the pixels are initialized to a predefined value such that a plurality of subsequent images in the first image sequence that are a predefined interval apart from each other are calculated.

7. The method of claim 6, wherein, for each of the plurality of subsequent images, the previously calculated image data are propagated from calculated images preceding and after the image and are blended.

8. The method of claim 1, wherein the position and motion information of the points on the one or more objects includes at least one of distance from camera, object identifiers (IDs), motion and pixel coverage information, depth information, and motion depth information.

9. The method of claim 8, wherein the occluded pixels are determined based on a comparison of the motion depth information and the depth data after pixels in adjacent images are aligned.

10. The method of claim 1, wherein the determining, calculating, and propagating steps are performed in both a forward and a backward direction using, for each of the plurality of subsequent images, a predefined number of images in the first image sequence preceding and after the image and proceeding inwards towards the image.

11. A non-transitory computer-readable storage medium storing a program, which, when executed by a processor performs operations for rendering a first sequence of images, the operations comprising:
rendering a second image sequence, without performing lighting calculations, to obtain position and motion information of points on one or more objects in a scene;
calculating or reconstructing a first image in a first image sequence; and
for each of a plurality of subsequent images in the first image sequence:
determining a subset of pixels in the image to be calculated, wherein the subset of pixels is less than all pixels in the image, and wherein the subset of pixels includes previously occluded pixels determined based on at least a portion of the position and motion information,
calculating image data for the determined subset of pixels, and
propagating previously calculated image data from one or more neighboring images in the first image sequence to each pixel in the image that is not calculated, wherein the previously calculated image data is propagated based on at least a portion of the motion information.

12. The computer-readable storage medium of claim 11, wherein the subset of pixels to be calculated further includes pixels whose age exceeds a predefined threshold.

13. The computer-readable storage medium of claim 12, wherein the ages of the pixels are initialized to random values within a range of values.

14. The computer-readable storage medium of claim 13, wherein, for each of the plurality of subsequent images, the previously calculated image data are propagated from images in the first image sequence preceding and subsequent to the image and are blended.

15. The computer-readable storage medium of claim 13, the operations further comprising, calculating a plurality of subsequent images in the first image sequence that are a predefined interval apart from each other.

16. The computer-readable storage medium of claim 12, wherein the ages of the pixels are initialized to a predefined value such that a plurality of subsequent images in the first image sequence that are a predefined interval apart from each other are calculated.

17. The computer-readable storage medium of claim 16, wherein, for each of the plurality of subsequent images, the image data are propagated from calculated images in the first image sequence preceding and after the image and are blended.

18. The computer-readable storage medium of claim 11, wherein the position and motion information of the points on the one or more objects includes at least one of distance from camera, object identifiers (IDs), motion and pixel coverage information, depth information, and motion depth information.

19. The computer-readable storage medium of claim 11, wherein the determining, calculating, and propagating steps are performed in both a forward and a backward direction using, for each of the plurality of subsequent images, a predefined number of images in the first image sequence preceding and after the image and proceeding inwards towards the image.

20. A system, comprising:
a processor; and
a memory, wherein the memory includes an application program configured to perform operations for rendering a first sequence of images, the operations comprising:
rendering a second image sequence, without performing lighting calculations, to obtain position and motion information of points on one or more objects in a scene,
calculating or reconstructing a first image in the first image sequence, and
for each of a plurality of subsequent images in the first image sequence:
determining a subset of pixels in the image to be calculated, wherein the subset of pixels is less than all pixels in the image, and wherein the subset of pixels includes previously occluded pixels determined based on at least a portion of the position and motion information;
calculating image data for the determined subset of pixels; and propagating previously calculated image data from one or more neighboring images in the first image sequence to each pixel in the image that is not calculated, wherein the previously calculated image data is propagated based on at least a portion of the motion information.

* * * * *